Figure 1:
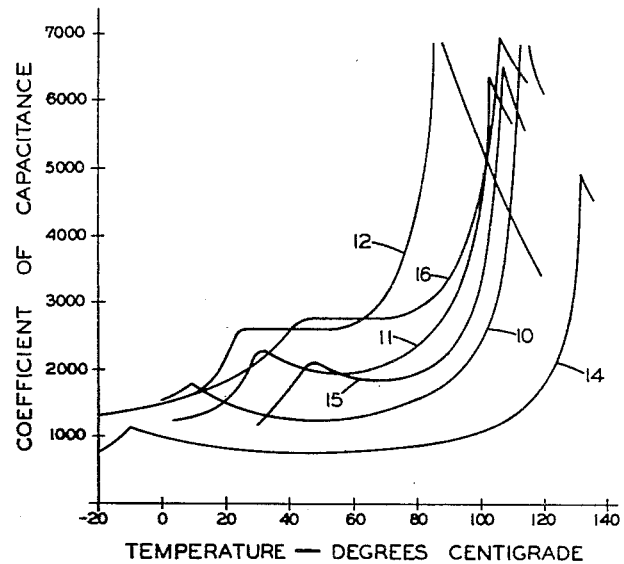

May 10, 1955  E. J. BRAJER  2,708,243
POLYCRYSTALLINE CERAMIC MATERIAL
Filed Feb. 10, 1951  2 Sheets-Sheet 1

INVENTOR.
EDWIN J. BRAJER
BY *Harry B. Page*
ATTORNEY

May 10, 1955  E. J. BRAJER  2,708,243
POLYCRYSTALLINE CERAMIC MATERIAL
Filed Feb. 10, 1951  2 Sheets-Sheet 2

INVENTOR.
EDWIN J. BRAJER
BY
ATTORNEY

United States Patent Office 2,708,243
Patented May 10, 1955

2,708,243

POLYCRYSTALLINE CERAMIC MATERIAL

Edwin J. Brajer, Maple Heights, Ohio, assignor, by mesne assignments, to Clevite Corporation, Cleveland, Ohio, a corporation of Ohio Application February 10, 1951, Serial No. 210,391

5 Claims. (Cl. 310—8)

This invention relates to a polycrystalline ceramic material which is suitable for use in translating electrical energy to mechanical energy or for translating mechanical energy to electrical energy.

In recent years it has been discovered that certain polycrystalline ceramic materials, consisting essentially of barium titanate fired to rather high temperatures, are useful in translating electrical energy to mechanical energy or for translating mechanical energy to electrical energy. A device utilizing such material is described and claimed in United States Letters Patent No. 2,486,560, granted on November 1, 1949, on an application of Robert B. Gray, filed on September 20, 1946.

Transducers of the type here under consideration have come into a rather extensive amount of use, particularly for certain applications. Most of these transducers have been composed almost wholly of barium titanate with only the usual commercial impurities and with relatively small percentages of other materials as additions. A very large amount of work has gone into research for various addition materials which will improve the operating characteristics of such polycrystalline ceramic material for its intended purpose. Most of the transducers of the type here under consideration have been given a permanent polarization by the application thereto of a rather high D. C. voltage during the manufacturing process. One of the improvements which has been sought in the research mentioned above has been an increase in the coefficients which relate the electrical energy applied to the material to the mechanical energy derived from the material or vice versa. Applicant has discovered a material which is greatly improved in this respect.

It is an object of the invention, therefore, to provide an improved polycrystalline ceramic material for use in converting electrical energy to mechanical energy or for use in converting mechanical energy to electrical energy.

It is a specific object of the invention to provide a prepolarized polycrystalline ceramic material which has a relatively large electromechanical coefficient for electrical signals applied in the direction of the polarization to produce strains at right angles to this direction.

It is still another object of the invention to provide an improved polycrystalline ceramic material which has operating characteristics which are relatively stable at normal ambient temperatures.

In accordance with the invention, a body of a ceramic material consists essentially of barium titanate in an amount greater than 96% and less than 98.5% by weight and zirconia in an amount less than 4% and greater than 1.5% by weight. The body of the ceramic material is permanently polarized in a given direction to exhibit electromechanical transducing properties with an electromechanical transducing coefficient at normal ambient temperatures substantially greater than $7 \times 10^{-3}$ volt-meter per newton for mechanical pressures and corresponding strains at right angles to the direction of polarization to produce voltages in the direction of polarization.

In accordance with a feature of the invention, an electromechanical transducer device comprises a dielectric body of the composition just mentioned, electrodes on opposed surfaces of the body for translating the electrical energy transduced therein, and mechanical means coupled to the body for translating the mechanical energy transduced therein.

The novel features which are believed to be characteristic of the invention are set forth with particularity in the appended claims. The invention itself, however, both as to its application and method of operation, together with other and further advantages thereof, will best be understood by reference to the following specification taken in connection with the accompanying drawings.

Figure 2:
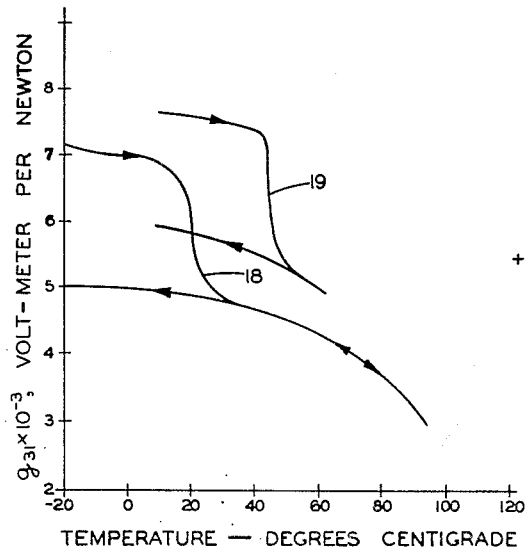
Figure 5:
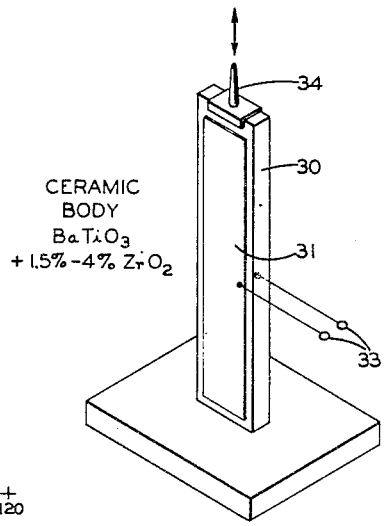
Figure 3:
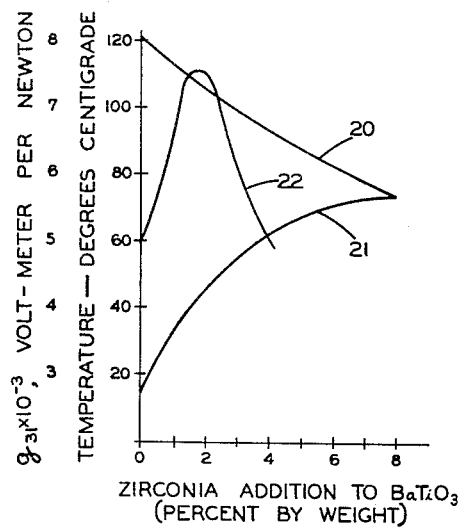
Figure 4:
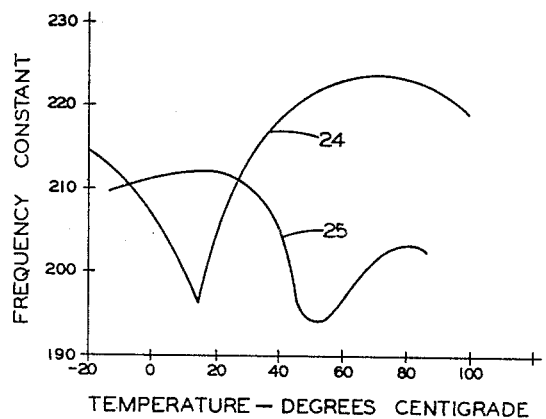

Fig. 1 of the drawings shows various temperature-capacitance curves utilized in explaining certain features of the invention; Fig. 2 comprises curves which illustrate certain electromechanical characteristics of the material of the invention and a comparable characteristic of a material comprised almost wholly of barium titanate; Fig. 3 comprises curves showing how one of the electromechanical characteristics of a material of the invention varies with the amount of zirconia added to the material; Fig. 4 comprises curves showing how the frequency constant of one of the materials of the invention varies in comparison with a material comprised almost wholly of barium titanate; and Fig. 5 shows in perspective an electromechanical transducing device incorporating the material of the invention.

Referring now more particularly to Fig. 1 of the drawings, there is there shown a curve 10 which illustrates how the coefficient of capacitance of a barium titanate body, fired to a high temperature, varies with temperature. In making any of the bodies to be considered hereafter, the ingredients in finely powdered form are thoroughly mixed and thereafter formed by any of the conventional ceramic processes as, for example, by pressing, casting, or extruding. Commercially available barium titanate ordinarily contains as impurities addition materials of less than 2% after firing and it is to be understood that applicant, by specifying a material consisting "essentially of" barium titanate, or any of the other materials mentioned, intends to include a material which may have up to this specified percentage of the various addition materials which are normally present in the commercial material such as the oxides of strontium, calcium, sodium, aluminum, and silicon. These impurities which are generally present in the commercial materials are usually sufficient to serve as a ceramic bond when the formed material is fired to high temperature. However, in the event that the barium titanate used does not contain impurities suitable for fluxing, it may be necessary to add to the material a small amount of a flux such as silica to serve as a ceramic bond. The ceramic material produced by firing barium titanate to a high temperature, for example within the range of 1300° C. to 1400° C., may be permanently polarized to exhibit a permanent electromechanical activity in the manner described in the above-mentioned Gray patent or may be polarized simply by the application thereto of a high unidirectional voltage at room temperature. Preferably this D. C. voltage is of the order of 25,000 volts per centimeter and is maintained for a sufficient time to induce a permanent effect on the electromechanical transducing properties or activity of the body. Actually it is found that the electromechanical activity of the body is usually somewhat higher immediately after the polarizing voltage is removed but that within 24 hours the effect apparently stabilizes and is thereafter maintained at a uniform value substantially indefinitely if the material is not thereafter subjected to high temperatures and/or voltages. It will therefore be understood that applicant intends the term "permanently polarized" herein to refer to the effect in the material present at least 24 hours after the polarizing voltage has been removed and substantially indefinitely thereafter, or at least for a period of several months.

It will be seen that the capacitance of barium titanate shown by curve 10 of Fig. 1 increases rapidly in the higher temperature range. Actually it reaches a maximum in the neighborhood of 120° C. and thereafter decreases. This point of maximum capacitance is herein called the "primary transition" point. Also, it will be seen that there is a minor transition point in the vicinity of 10° C. This is hereinafter called the "secondary transition point," meaning the next point below the primary transition point where there is a sudden decrease in slope of the capacitance variation as the temperature is increased. This secondary transition point is seen to occur within the range of normal ambient temperatures. As used in this specification, the expression "normal ambient temperatures" is intended to mean the range of temperatures normally encountered due to weather conditions in nature, say, for example, from about 0° C. to around 40° C.

For some transducer applications, the capacitance variations of barium titanate mentioned above are troublesome. Many materials which have been added in small percentages to barium titanate in the research mentioned above have had the effect of lowering the primary transition point appreciably. Moreover, most of such addition materials have also shown a decided tendency detrimentally to affect the electromechanical characteristics of the resulting material. In general, this is true regardless of the form in which the materials are added in the mixture before firing. Curve 11, for example, shows the characteristic of a barium titanate material to which 2% by weight of stannic oxide ($SnO_2$) has been added, while curve 12 shows the corresponding characteristic of a material containing an addition of 4% by weight of barium stannate ($BaSnO_3$).

One addition material which has been used in electromechanically sensitive materials of the general type here under consideration has been lead, added in the form of lead titanate. This addition has been found to have the effect of shifting the secondary transition point lower in the temperature scale, as shown by the curve 14 of Fig. 1. Barium titanate material including about 4% lead titanate by weight has found some use commercially for the reason that it has acceptable coefficients relating electrical energy to mechanical energy and the secondary transition point is shifted below the range of normal ambient temperatures or at least low in this range.

Applicant has discovered that the addition of small amounts of zirconium oxide ($ZrO_2$), or zirconia, has the effect of shifting the secondary transition point appreciably upwards in the temperature scale and has further discovered that, if the resulting material is polarized at a temperature below this secondary transition point, the coefficients relating electrical energy to mechanical energy, or vice versa, are materially increased. Zirconium compound additions have the unique property of shifting the secondary transition point upwards more than they shift the primary point downwards. A result of a suitable addition of zirconia, as will appear hereinbelow, is that such ceramic materials having remanent electrostatic polarization in a given direction provide increased electromechanical response coefficients at normal ambient temperatures, as compared at such temperatures with polarized barium titanate ceramic material without the addition of zirconia. Of special interest is the fact that mechanical stresses or pressures applied perpendicular to the direction of polarization, the corresponding mechanical strains of course also being at right angles to the direction of polarization, produce large voltages in the direction of polarization. This coefficient is hereinafter called "$g_{31}$." The temperature-capacitance curve of a material comprised almost wholly of barium titanate ($BaTiO_3$) with an addition of 2% by weight of zirconia ($ZrO_2$) is shown in curve 15 of Fig. 1. A corresponding curve for a material in which the addition is 4% by weight of barium zirconate ($BaZrO_3$) is shown in curve 16.

The $g_{31}$ constant for a material containing essentially barium titanate and polarized below its secondary transition point as a function of temperature is shown in curve 18 of Fig. 2. It will be seen that, as the temperature is first increased and then decreased, the resulting $g_{31}$ constant obtained for any particular temperature below the secondary transition point is lower after the material has been treated above the secondary transition point. These constants are given in terms of $10^{-3}$ volt-meter/newton. A corresponding curve for barium titanate containing approximately 2% by weight of zirconia is shown in curve 19 of Fig. 2. It will be seen that the $g_{31}$ coefficient in the temperature range around 25° C. is substantially constant for the material with the zirconia addition and, furthermore, that it is substantially higher than that available at the same temperature from the material which consists essentially of barium titanate, even though the latter material may have been polarized at a temperature well below room temperature as represented by the upper portion of curve 18, provided that the material containing zirconia has not been exposed to a temperature above its secondary transition after polarization below this point.

The curves of Fig. 3 illustrate the variation in the characteristics of the material with various percentages of the zirconia addition. Thus the curve 20 shows how the primary transition point varies with increasing amounts of zirconia. Specifically, this primary transition point is around 120° C. for a barium titanate material with no zirconia present and drops to around 75° C. when about 8% zirconia by weight is added. The manner in which the secondary transition point is raised by the addition of the zirconia is illustrated by the curve 21. Here it is seen that the secondary transition point for barium titanate having no zirconia present is near 15° C. and increases to some 75° C. with approximately 8% by weight of zirconia.

The manner in which the $g_{31}$ constant varies over the temperature range under consideration is illustrated in Fig. 3 by the curve 22. Since, from the curve 19 of Fig. 2 it is seen that the $g_{31}$ constant of the material increases very radically when the material is polarized and operated below the secondary transition point, it is very desirable, therefore, to keep normal operation of the material within this range. It is furthermore desirable, in order to extend the operating range as much as possible, to have the secondary transition point as high in the temperature range as is reasonably feasible. Under these conditions, it is readily seen from the curves of Fig. 3 that the most desirable operating characteristics of the material are provided when the amount of zirconia added is about 2% by weight, although it is also seen that very much improved operating characteristics are provided when the material has less than 4% but greater than 1.5% zirconia by weight. It will be understood that the remainder of the material, namely, 96% to 98.5% by weight, is essentially barium titanate. It is also seen from Fig. 2 that the 2% addition of zirconia produces a $g_{31}$ electromechanical transducing coefficient at normal ambient temperatures which is well above $7 \times 10^{-3}$ volt-meter per newton. To some extent, the addition of zirconia herein disclosed facilitates the formation of a ceramic bond, so that smaller amounts of other glass-forming oxides, such as silica, are needed.

It will be evident that, in utilizing these operating characteristics to carry out transducing between the two types of energy designated as electrical energy and mechanical energy, the electrical signal energy or the mechanical energy is applied from a source of one of these types of energy to a dielectric body of a ceramic material having the aforementioned composition, whereupon energy of the other of these types, transduced in the body from the applied energy, is derived from the material of the body, as is evidenced in well known manner by the development and utilization of mechanical signal force or motion or of electrical signal current or potential.

The materials involved in the practice of the invention also have another operating characteristic which is very valuable in some applications due to the fact that the frequency constant of the material is relatively stable over the range of normal ambient temperatures. Many of the ceramic transducers of the type here under consideration are operated at a resonance, or at a frequency sufficiently near a resonance of the body involved that the operation of the device is controlled to a considerable extent by the resonance involved. Temperature changes in such bodies comprised almost wholly of barium titanate have a very strong tendency to shift the frequency of the resonance involved and this is very undesirable in most cases. Referring to Fig. 4, the frequency constant, or the frequency at which a unit length of the material is resonant, versus temperature is shown in curve 24 for barium titanate. It will be seen that there is a very sharp dip in the curve in the vicinity of 15° C. The corresponding curve for a body comprised of barium titanate with an addition of 3% of zirconia is shown in curve 25. It will be seen that this curve is relatively stable over the range of normal ambient temperatures. Thus bodies composed of this material have very much less tendency to change in resonant frequency than does a body composed of barium titanate over the range of normal ambient temperatures. The material having 3% zirconia was chosen purely for the purpose of an example and it will be understood that all of the bodies comprising barium titanate plus a zirconia addition within the range of 1.5% and 4% are much more stable in this respect than is a body composed wholly of barium titanate.

The following chart is provided, comparing the $g_{31}$ constants of various compositions polarized at room temperature:

|  | $10^{-3}$ volt-meter/newton |
|---|---|
| $BaTiO_3$ | 5 |
| $BaTiO_3 + 2\% \ ZrO_2$ | 7.6 |
| $BaTiO_3 + 3\% \ BaSnO_3$ | 4.6 |
| $BaTiO_3 + 4\% \ PbTiO_3$ | 4.2 |
| $BaTiO_3 + 4\% \ BaZrO_3$ | 4.0 |

It will thus be seen that applicant, by his invention, has provided a ceramic dielectric body of a material which has greatly improved operating characteristics and, specifically, a much greater electro-mechanical activity in the normal range of operating temperatures. The material of the invention may be illustrated in the form of an elongated ceramic body arranged for use as an electromechanical transducer. As shown in the perspective view of Fig. 5, the body 30 is fastened in an upright position on a suitable base surface. One of the major faces of the body is provided with a thin conductive electrode 31. The other major face, hidden in the figure, has a similar electrode. Electrical leads connect the electrodes individually with a pair of terminals 33. The free end of the body 30 carries a stylus 34 securely clamped thereto for translating the mechanical motion associated with electromechanical transducing in the body 34.

It is assumed that the body 30 has been permanently polarized in the thickness direction by the application of a high unidirectional voltage across the terminals 33. As mentioned hereinabove, the application of mechanical stresses in a direction perpendicular to the direction of polarization produces large voltages in the direction of polarization. In this case stresses applied so as to move the stylus 34 in a vertical direction, as indicated in Fig. 5 by the double arrow, cause the generation of corresponding signal voltages across the terminals 33. It will be understood that, conversely, the application of signal voltages across the terminals produces corresponding lengthwise strains in the bar 30 and vertical motion of the stylus 34.

Accordingly there is provided an electromechanical transducer device, which may or may not be operated at a resonance as discussed hereinabove with reference to ceramic transducer devices, comprising a ceramic dielectric body 30, consisting essentially of barium titanate and 1.5%–4% zirconia, with electrodes, such as the electrode 31, on opposed surfaces of the body for translating the electrical energy transduced in the body and with mechanical means, such as the stylus 34, coupled to the body for translating the mechanical energy transduced therein. The ceramic material of the body advantageously is in a condition of remanent electrostatic polarization to permit transducing from electrical to mechanical signal energy, or vice versa, without the continuous application of a polarizing potential but with the high electromechanical responses indicated hereinabove.

While there have been described what are at present considered to be the preferred embodiments of the invention, it will be obvious to those skilled in the art that various changes and modifications may be made therein without departing from the invention and it is, therefore, aimed to cover all such modifications and changes as fall within the true spirit and scope of the invention.

What is claimed is:

1. An electromechanical transducer device, comprising: a dielectric body of a ceramic material consisting essentially of barium titanate in an amount greater than 96% and less than 98.5% by weight and zirconia in an amount less than 4% and greater than 1.5% by weight; electrodes on opposed surfaces of said body for translating the electrical energy transduced therein; and mechanical means coupled to said body for translating the mechanical energy transduced therein.

2. An electromechanical transducer device, comprising: a dielectric body of a ceramic material consisting essentially of approximately 98% by weight of barium titanate and approximately 2% by weight of zirconia; electrodes on opposed surfaces of said body for translating the electrical energy transduced therein; and mechanical means coupled to said body for translating the mechanical energy transduced therein.

3. An electromechanical transducer device, comprising a dielectric body of a ceramic material consisting essentially of barium titanate in an amount greater than 96% and less than 98.5% by weight and zirconia in an amount less than 4% and greater than 1.5% by weight, said ceramic material having remanent electrostatic polarization in a given direction to provide increased electromechanical response coefficients at normal ambient temperatures, as compared with polarized barium titanate ceramic material without said zirconia, including an electromechanical transducing coefficient at normal ambient temperatures greater than $7 \times 10^{-3}$ volt-meter per newton for mechanical pressures and corresponding strains at right hangles to said direction of polarization to produce voltages in said direction of polarization; electrodes on opposed surfaces of said body for translating the electrical signal energy transduced therein; and mechanical means coupled to said body for translating the mechanical energy transduced therein.

4. A body of a ceramic material consisting essentially of barium titanate in an amount greater than 96% and less than 98.5% by weight and zirconia in an amount less than 4% and greater than 1.5% by weight and permanently polarized in a given direction to exhibit electromechanical transducing properties with an electromechanical transducing coefficient at normal ambient temperatures substantially greater than $7 \times 10^{-3}$ volt-meter per newton for mechanical pressures and corresponding strains at right angles to said direction of polarization to produce voltages in said direction of polarization.

5. A body of a ceramic material consisting essentially of approximately 98% by weight of barium titanate and approximately 2% by weight of zirconia and permanently polarized in a given direction to exhibit electromechanical transducing properties with an electromechanical transducing coefficient at normal ambient temperatures substantially greater than $7 \times 10^{-3}$ volt-meter per newton for mechanical pressures and corresponding strains at right angles to said direction of polarization to produce voltages in said direction of polarization.

References Cited in the file of this patent

UNITED STATES PATENTS

| | | |
|---|---|---|
| 2,402,516 | Wainer | June 18, 1946 |
| 2,467,169 | Wainer | Apr. 12, 1949 |
| 2,486,560 | Gray | Nov. 1, 1949 |
| 2,529,719 | Wentworth | Nov. 14, 1950 |
| 2,602,753 | Woodcock et al. | July 8, 1952 |

FOREIGN PATENTS

| | | |
|---|---|---|
| 574,577 | Great Britain | Jan. 11, 1946 |